United States Patent

Shimotori et al.

[15] 3,663,767

[45] May 16, 1972

[54] MAGNETIC HEAD

[72] Inventors: Kazumi Shimotori, Kawasaki-shi; Michiyasu Takagi, Yokohama-shi; Yoshihisa Kawamura, Chigaski-shi; Shoichi Kiyooka, Zushi-shi, all of Japan

[73] Assignee: Tokyo Shibaura Electric Co., Ltd., Kawasaki-shi, Japan

[22] Filed: Nov. 12, 1969

[21] Appl. No.: 875,937

[30] Foreign Application Priority Data

Nov. 16, 1968 Japan....................................43/83666
Nov. 16, 1968 Japan....................................43/83667

[52] U.S. Cl. ........................179/100.2 C, 148/104, 148/16.6
[51] Int. Cl. ..........................................................G11b 5/00
[58] Field of Search .............179/100.2 C; 29/603; 252/62.5; 117/235; 340/174.1 F; 346/74; 148/16.6, 105, 104

[56] References Cited

UNITED STATES PATENTS

| | | | |
|---|---|---|---|
| 2,992,474 | 7/1961 | Adams et al. | 179/100.2 C |
| 2,666,724 | 1/1954 | Beller et al. | 148/105 |
| 3,336,167 | 8/1967 | Tanaka | 148/16.6 |

*Primary Examiner*—Maynard R. Wilbur
*Assistant Examiner*—William W. Cochran
*Attorney*—Flynn & Frishauf

[57] ABSTRACT

A magnetic head used in recording information in a magnetic tape or reading out the information already stored therein, which comprises a pair of head tips oppositely formed at the end with a minute gap allowed therebetween, each of the head tips being made of an alloy essentially consisting of 3 to 18 percent by weight of aluminum, 0 to 12 percent by weight of silicon, and iron and impurities as the remainder and at least part of the surface area of the head tip contacting the magnetic tape being provided with a nitride layer containing 10 to 12 percent by weight of nitrogen.

5 Claims, 12 Drawing Figures

MAGNETIC HEAD

The present invention relates to a magnetic head used in magnetically recording information in a magnetic tape or disc or taking out the information stored therein in the form of electrical signals. This magnetic head can be employed as the electro-magnetic conversion element, for example, of a video tape recorder, audio tape recorder or computer memory device.

The electro-magnetic converting property of such magnetic head depends on the magnetic properties of a head tip used therein and the life of the magnetic head relies on the abrasion resistance or hardness of the head tip. Therefore there can be only prepared a desirable magnetic head from a head tip formed of a material having both excellent magnetic properties and great hardness. With a known magnetic material, magnetic properties and hardness are incompatible factors. To give an instance, an Ni-Fe alloy (commonly known as Permalloy) widely accepted as the head tip of a magnetic head is unsatisfactory in abrasion resistance due to its relatively low hardness. On the other hand, ferrite has a great hardness and is indeed fully satisfactory in abrasion resistance, but presents difficulties in working due to its very hardness. Moreover, when a head tip made of ferrite is operated, there are generated noises characteristic of ferrite, so that such head tip is far inferior to that of the aforesaid Permalloy in the signal-to-noise ratio.

It is accordingly the object of the present invention to provide a magnetic head whose head tips are so improved as to be reduced in abrasion resistance only insofar as its magnetic properties do not substantially decrease.

The magnetic head of the present invention includes a pair of tips, each having a nitride layer containing 10–12 percent by weight of nitrogen formed at least in part of its surface (hereinafter referred to as "a contact surface") contacting a magnetic tape during operation. The head tip is prepared from an alloy essentially consisting of 3 to 18 percent by weight of aluminum, 0 to 12 percent by weight of silicon, and iron and impurities as the remainder. This alloy generally has a crystal structure having a body-centered cubic lattice. Its typical product known as a Sendust alloy has a desirable high magnetic permeability when used as the material of a head tip. We have discovered that nitrization of said alloy under proper conditions results in the formation of a prominently hard layer on its surface.

A preferred example of said nitriding process consists in heating a head tip to be treated for a short length of time, say, 2 to 5 hours at a temperature of about 500° in an atmosphere containing at least 40 percent of ammonia gas. This mild nitriding process produces a nitride layer containing about 10 percent of nitrogen on the surface of the head tip. This nitride layer has a hardness twice or more greater than the other non-nitrided parts of the alloy, thus improving the abrasion resistance of the head tip. Also it was found to be ferromagnetic.

This invention can be more fully understood from the following detailed description when taken with reference to the accompanying drawings, in which:

FIG. 1 is a plan view of a magnetic head according to an embodiment of the present invention;

FIGS. 2 and 3 respectively represent the side and plan views of an assembly for nitriding the head tips of the magnetic head of FIG. 1;

Figure 1:
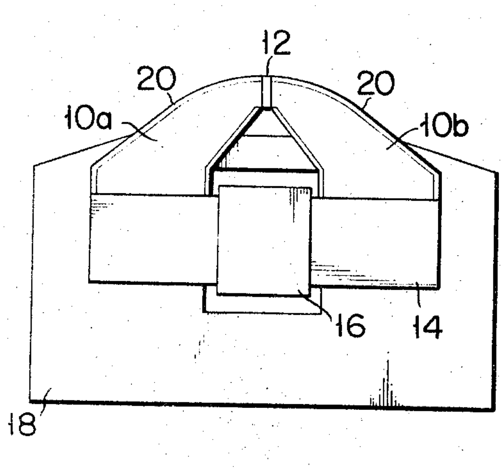

FIG. 1 illustrates a magnetic head for a video tape recorder according to a preferred embodiment of the present invention. This magnetic head comprises a pair of head tips 10*a* and 10*b* oppositely formed at the end with a minute gap allowed therebetween. Within said head gap is disposed a gap piece 12 made of nonmagnetic material. The other end of each of the head tips 10*a* and 10*b* contacts the side of a yoke 14, on which is supported a coil 16 schematically illustrated in FIG. 1 for convenience. Thus there is formed a magnetic core by the head tips 10*a* and 10*b* and yoke 14. These head tips 10*a* and 10*b* and yoke 14 are bonded by a suitable organic adhesive agent to one side of a base 18 made of nonmagnetic material such as brass. The head tips 10*a* and 10*b* have a nitride layer 20 formed on the "contact surface" as defined above.

Figure 2:
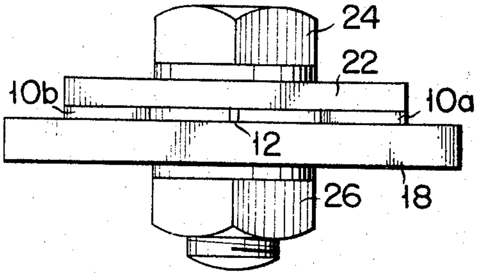
Figure 3:
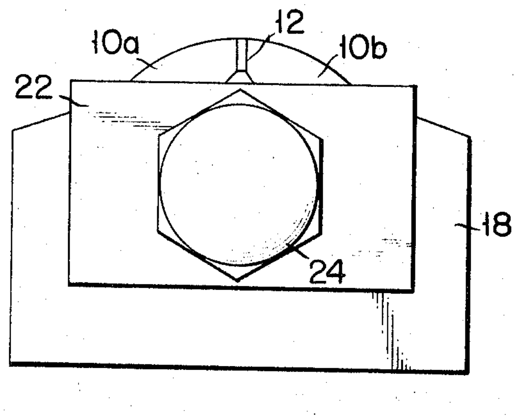

This nitride layer 20 may be formed, for example, by the following process. The head tips 10*a* and 10*b* joined together by the gap piece 12 are inserted, as shown in FIGS. 2 and 3, between the base 18 and a plate 22 and tightened together using a bolt 24 penetrating the plate 22 and base 18 and nuts 26 so as to prevent all the parts thus assembled from being displaced in position. The nitriding process of the head tips 10*a* and 10*b* is carried out by heating this assembly in an atmosphere containing ammonia gas using a suitable heating means, for example, an electric furnace.

With respect to the nitride layer formed on the surface of the head tips 10*a* and 10*b*, the composition of an alloy constituting the head tip assumes great importance in preparing a nitride layer having desirable hardness and magnetic properties. We have discovered that there can be formed a preferable nitride layer on the head tip if it is made of an alloy consisting of 3 to 18 percent by weight of aluminum, 0 to 12 percent by weight of silicon, and iron and impurities as the remainder. This alloy may also include 3 percent by weight max. of at least one of the groups consisting of elements having a strong combining force with nitrogen, such as titanium, hafnium, thorium, cerium, lanthanum, scandium, cadmium, tantalum, magnesium, molybdenum and chromium.

When a head tip formed of such alloy is heated in an atmosphere containing ammonia gas to a relatively low temperature, preferably 250° to 750° C, nitrogen permeates through the surface of the head tip to form a nitride layer therein. The nitrogen content of said layer mostly depends on the temperature of nitrization and the thickness thereof on the time of nitrization. It is experimentally confirmed that a nitride layer 2 to 50 microns thick containing up to 12 percent of nitrogen is adapted to provide a head tip having most desirable properties. It is also surprisingly discovered that said nitride layer is a ferromagnetic substance having a small coercive force, because iron nitride containing 11.3 percent nitrogen does not display any magnetic property at all. This means that formation of such nitride layer on the surface of a head tip effectively prevents it from prominently decreasing in magnetic properties.

Figure 4:
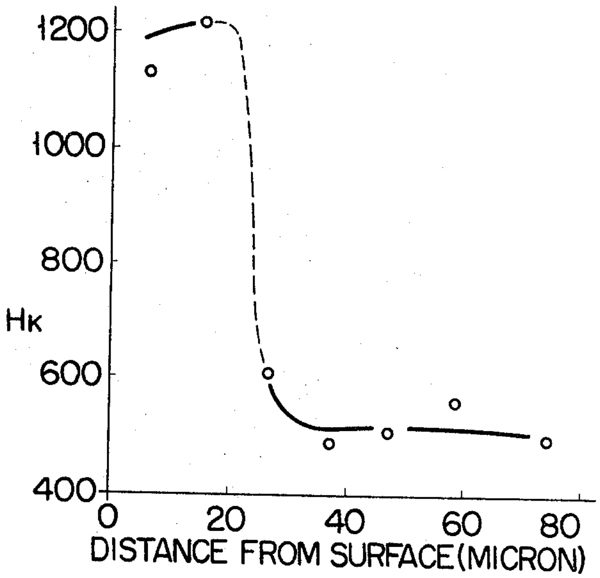
FIGS. 4 and 5 are graphic representations of the varying hardnesses of head tips according to other embodiments of the invention corresponding to the depth of a nitride layer as measured from the surface.
Figure 5:
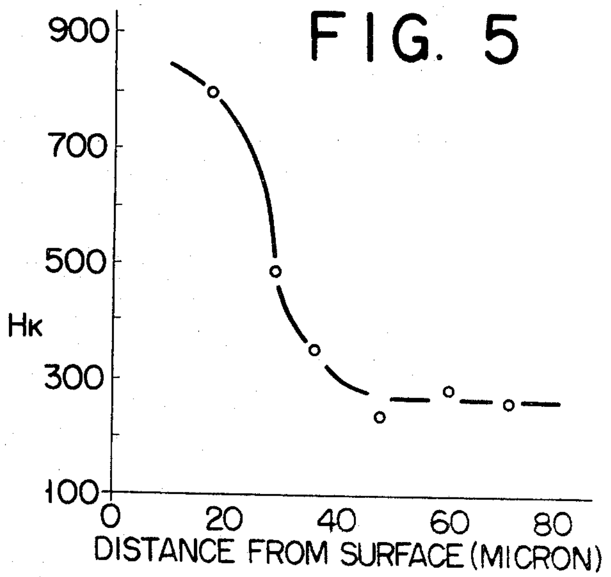

As mentioned above, the nitride surface of a head tip has a far greater hardness than its other non-nitrided portions. For illustration, there is presented in the graph of FIG. 4 the knoop hardness at several points on a line perpendicular to the surface of the nitride layer of a head tip. This graph represents the plotted results of values of hardness determined on a head tip made of a 6.2 percent Al–9.6 percent Si-Fe alloy which was nitrided in a pure ammonia gas by being heated 2.5 hours at a temperature of about 500° C. as apparent from this figure, a nitride layer about 20 microns thick has a hardness about 2.4 times greater than the non-nitrided portion of the head tip which is disposed below said layer. FIG. 5 shows the varying hardnesses of a head tip made of a 16 percent Al-Fe alloy and nitrided in a pure ammonia gas by being heated 2 hours at a temperature of about 550° C which correspond to the depth of the nitride portion of the head tip as measured from its surface.

Figure 6:
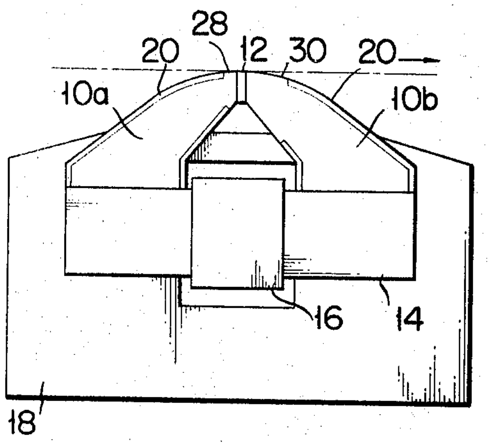
FIG. 6 is a plan view of a magnetic head according to a further embodiment of the invention.
Figure 7:
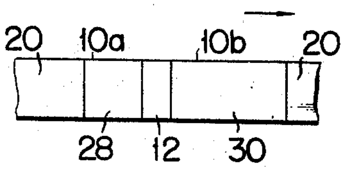
FIG. 7 is a side view, partly enlarged, of the head tips of the magnetic head of FIG. 6.

FIGS. 6 and 7 represent a magnetic head according to another embodiment of the present invention. The identical or similar parts of these figures to those of FIG. 1 are denoted by the same numerals. On that side of one head tip 10*a* contacting the magnetic tape, there is formed a nitride layer 20 except for its portion 28 of a certain width adjacent to the gap piece 12. On the other hand, that side of the other head tip 10*b* contacting the magnetic tape is also provided with a nitride layer 20 except for its portion 30 of a certain width adjacent to the gap piece 12. The latter portion 30 is somewhat broader than the former 28. The magnetic head of FIG. 6 is employed in actual application in such a manner that the head tip 10*a* having said narrow non-nitrided portion 28 assumes a position on that side of said magnetic head first contacted by the magnetic tape when it travels in the direction indicated by the arrow. Friction between this magnetic head and magnetic tape is mainly reduced by the nitride layer formed on the head tip 10*a*. Electro-magnetic conversion between the magnetic head and magnetic tape is mostly carried out in the portions 28 and 30 of the respective head tips 10*a* and 10*b* which are not coated with the nitride layer 20, namely, those where said conversion can be performed very efficiently. Accordingly, the magnetic head of FIG. 6 has both good magnetic properties and great abrasion resistance.

Figure 8:
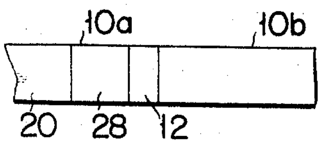

FIG. 8 shows the contact surface of a head tip according to another embodiment of the present invention. In this embodiment, one head tip 10*a* has both nitride layer and non-nitrided portion 28 like that of FIG. 7, whereas the other head tip 10*b* has no nitride layer at all. However, in this case, too, the nitride layer 20 formed on the head tip 10*a* which is so disposed as to be first contacted by a traveling magnetic tape and in consequence generally tends to be noticeably abraded, can effectively minimize such abrasion, thus attaining the object of the present invention.

Figure 9:
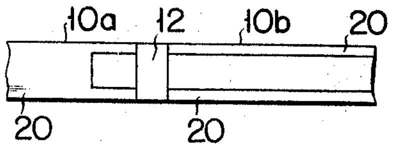
Figure 10:
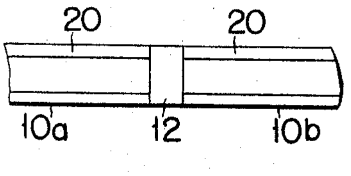

FIG. 9 illustrates a magnetic head according to still another embodiment which comprises not only a nitride layer shown in FIG. 8, but also another nitride layer 20 of suitable width formed on both sides of each of the head tips 10*a* and 10*b*. FIG. 10 represents a magnetic head wherein there is formed a nitride layer 20 of suitable width only on both sides of the head tips 10*a* and 10*b* respectively. The embodiment of FIGS. 9 and 10 can display the same excellent magnetic properties and abrasion resistance as those of FIGS. 6 and 8. The selective nitrization used in FIGS. 8 to 10 is carried out by vapor depositing a film of copper or Pb-Sn alloy on the portion of the head tip which it is not desired to nitride and grinding away said film after nitrization.

Figure 11:
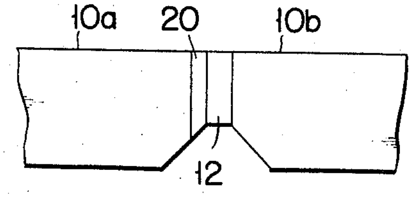
FIG. 11 is a plan view, partly enlarged, of the head tips of a magnetic head according to a still further embodiment of the invention.

The magnetic head according to the present invention may also be prepared by forming a nitride layer, shown in FIG. 11, only on that surface of either or both of the head tips 10*a* and 10*b* which faces the gap piece 12. In an aspect of the embodiment of FIG. 11, one head tip 10*a* was made of a 5.5 percent Al–9.7 percent Si-Fe alloy and there was only formed a nitride layer about 10 microns thick on that surface of the head tip facing the gap piece by heating said head tip in a pure ammonia gas 2.5 hours at a temperature of about 510° C. After the nitriding treatment, the head tip 10*a* was assembled with the other head tip 10*b* and gap piece 12 to form a magnetic head having substantially the same arrangement as in FIG. 1.

The magnetic head thus prepared was incorporated in an ordinary video tape recorder and put to a practical test continuously under substantially the same conditions in which it is commonly used. The test shows that as compared with a magnetic head of the same specification but lacking a nitride layer, the aforementioned magnetic head finally indicated an output only decreased by 20 percent and an abrasion of 6 microns/100 hrs or about one-third of that which is generally observed in a conventional non-nitrided magnetic head.

Figure 12:
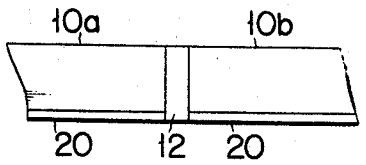
FIGS. 8 to 10 and 12 are similar side views to FIG. 7 of the head tips of magnetic heads according to still further embodiments of the invention.

FIG. 12 illustrates head tips 10*a* and 10*b* having a nitride layer 20 formed only on one side thereof. Each of the head tips was made of a 5.5 percent Al–9.7 percent Si-Fe alloy and nitride under the same conditions as in FIG. 11. When this magnetic head was continuously tested using the same video tape recorder as in the previous case, it indicated an abrasion of about 8 to 9 microns/100 hrs or equal to about half of that which is generally displayed by a prior art non-nitrided magnetic head.

While the present invention permits the use of a head tip made of a polycrystal alloy, it is desired that prior to the nitriding process, the head tip be made from a single crystal block which has been subjected by a known method to a suitable treatment so as to convert it into a single crystal form. A head tip formed of a single crystal alloy allows a nitride layer to be generated concentratedly in a shallow portion near its surface, so that the head tip is saved from reduced impact resistance resulting from said nitrization. Where a head tip is made of a polycrystal alloy, the nitrization progresses along the boundary of crystals. Even in such case, decrease in the mechanical strength of the head tip will be limited within a negligible range since the nitrogen content is relatively small.

What we claim is:

1. A magnetic head comprising a pair of head tips oppositely formed at the end of the head with a head gap therebetween, said head tips being adapted to contact a magnetic tape, each head tip being made of an alloy consisting of 3 to 18 percent by weight of aluminum, 0 to 12 percent by weight of silicon, and iron and impurities as the remainder, at least one portion of the surface of each head tip which is adapted to contact said magnetic tape being provided with a ferromagnetic nitride layer containing 10 to 12 percent by weight of nitrogen.

2. The magnetic head according to claim 1 wherein the nitride layer is 2 to 50 microns thick.

3. The magnetic head according to claim 1 wherein the alloy constituting the head tip contains at least one element of the group consisting of titanium, hafnium, thorium, cerium, lanthanum, scandium, cadmium, tantalum, magnesium, molybdenum and chromium, in amounts equivalent to 3 percent by weight max. on the basis of the entire alloy.

4. The magnetic head according to claim 1 wherein the alloy constituting the head tip is of the polycrystal type.

5. The magnetic head according to claim 1 wherein the alloy constituting the head tip is of the single crystal type.

* * * * *